A. W. Morse,
Harvester Cutter.
No 34,213.                                    Patented Jan. 21 1862.
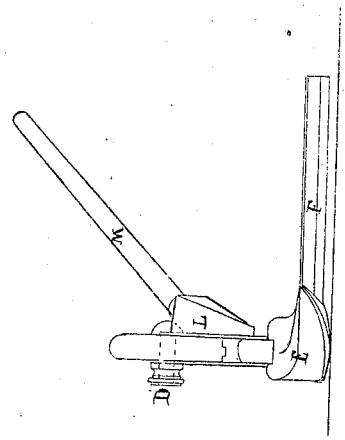
A. W. Morse
Witness
J. H. Field
Saml Johnston
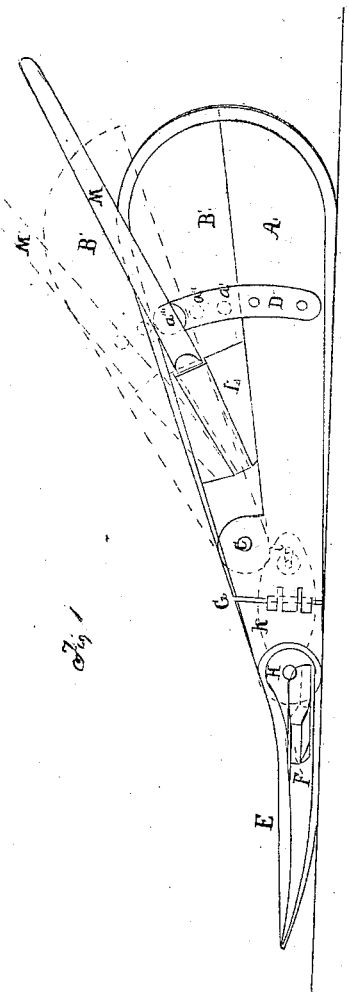
Fig. 1
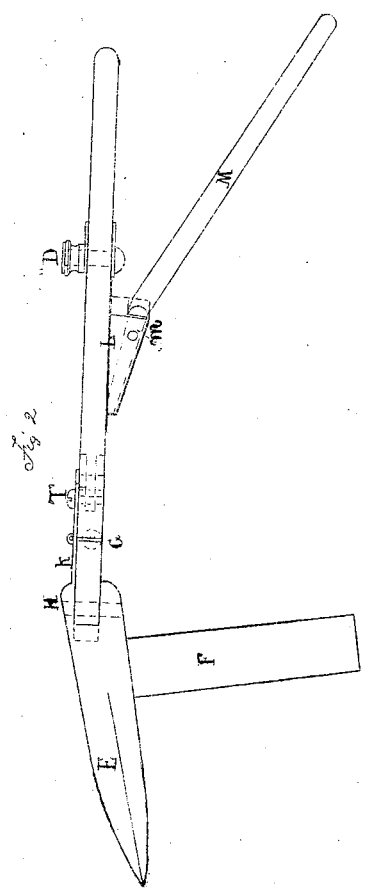
Fig. 2
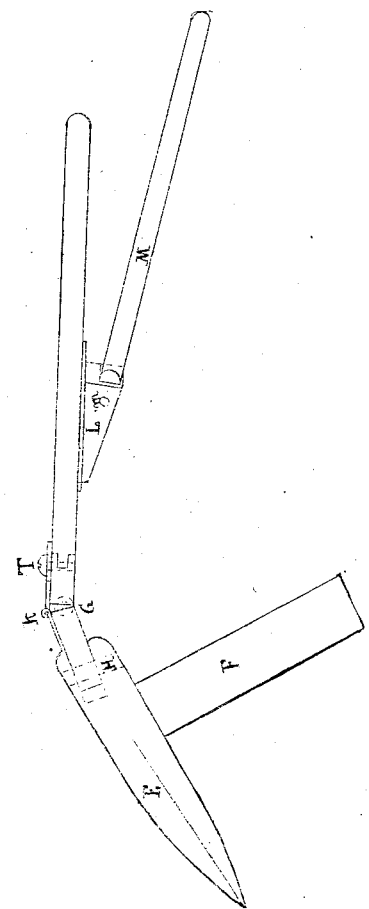

UNITED STATES PATENT OFFICE.

ALBERT W. MORSE, OF EATON, NEW YORK.

IMPROVEMENT IN TRACK-CLEARERS IN MOWING-MACHINES.

Specification forming part of Letters Patent No. 34,213, dated January 21, 1862.

*To all whom it may concern:*

Be it known that I, ALBERT W. MORSE, of the town of Eaton, in the county of Madison and State of New York, have invented a new and Improved Track-Clearer for Mowing-Machines for Cutting Grass; and I do hereby declare that the following is a full and exact description thereof, reference being had to the accompanying drawings, and to the letters of reference marked thereon.

The nature of my invention consists in making a track clearer for a grass-harvester in such a manner as to accomplish the object desired more perfectly by making the same expandible vertically and adjustable laterally in a simple and efficient manner, and so arranged with an adjustable handle that by changing the position of the handle the capacity of the track-clearer is controlled, so as to adapt it to different circumstances, and all for the purpose of scraping the cut grass inward toward the machine, and making a clear track for the machine in the succeeding swath, as hereinafter described.

To enable others skilled in the art to make and use my invention, I will proceed to describe its construction and operation.

I make the track-clearer of wood or any other suitable material, about three feet long and from fifteen to twenty inches high, and attach the same to the rear of the outer end of the finger-bar of a grass-harvester at an acute angle therewith by a hinged joint to the said bar, or to the outer shoe on the end therewith. It rises gradually backward from the forward end, is made in three parts, as represented in the drawings, Figure 1. The rear upper part is about one half of the width of the track-clearer, and is hinged at its forward end to a part of said track-clearer, as represented in the drawings, Fig. 1, letter C. I attach two guides in segmental form on each side of said track clearer, near the rear end, which are permanently fastened to the lower part of said track-clearer, between which the upper part is raised and supported, and held at any given point by means of a bolt or a set-screw, as shown by letters $a'$ $a''$ $a'''$, Fig. 1. The front end of the track-clearer is connected with the rear part thereof at about eight or ten inches from the extreme front part by two hinges, one on each side, and the hinge on the outside is fastened permanently at the forward end to the side of the track-clearer, and the back part of said hinge has a slot and a set-screw, so that the track-clearer at this point has a flexible joint, which may be rendered rigid by the means of a set-screw, and the angle of the track-clearer, with the finger-beam, may be varied as desired, and the track-clearer may be held at any desired angle, and may thus be made to operate more perfectly in different kinds of grass and on different lands and when the wind seriously affects its operation. This slot and set-screw is shown in Fig. 1 by letter T. I attach upon the inside of the track-clearer a casting, with a hole or socket therein for the insertion of a handle therein about three feet long. This handle is bent near where it is inserted into the socket, and its insertion in four different ways, which changes the crook each time, has an important effect in the operation of the track-clearer to prevent clogging and aid in turning the grass inward. This casting is represented in the drawings by letter L in Fig. 2, and the handle by letter M, which is fastened by a pin passing through the same and the casting, and can be readily removed when the position of the handle is to be changed.

The finger-bar is represented in the drawings by letter F, and the outer shoe and divider by letter E. The upper movable part of said track-clearer by letter B; the lower part by letter A.

Having thus fully described my invention, what I claim as new and original and desire to secure by Letters Patent is as follows, viz:

1. A track-clearer to a grass-harvester, capable of being expanded vertically and adjusted laterally, in combination with an adjustable handle attached to it in such a manner as to regulate its capacity as circumstances may require, substantially as and for the purposes herein set forth.

2. The adjustable handle M, when combined with a track-clearer by means of the socket and fastening, substantially as and for the purpose specified.

A. W. MORSE.

Witnesses:
JOS. C. FIELD,
SAML. JOHNSTON.